United States Patent Office

3,542,708
Patented Nov. 24, 1970

1

3,542,708
STARCH POLYETHYLENIMINO THIOURETHANE
REINFORCED RUBBERS
Judith A. Douglas, Peoria, and George G. Maher, Dunlap, Ill., assignors to the United States of America as represented by the Secretary of Agriculture
No Drawing. Filed Nov. 13, 1968, Ser. No. 775,526
Int. Cl. C08d 9/06
U.S. Cl. 260—17.4                                    3 Claims

ABSTRACT OF THE DISCLOSURE

Synthetic rubbers coprecipitated from latices containing added starch polyethylenimino thiourethanes, obtained by reacting low D.S. starch xanthate and polyethylenimine, comprise tan colored, easily dewatered crumbs that can be sheeted and then vulcanized with unexpected rapidity to provide highly reinforced rubber stocks that possess greatly improved strengths and abrasion resistances comparable to those obtained with conventional reinforcing agents that are incapable of shortening the vulcanization time or of yielding lightly colored rubber.

A nonexclusive, irrevocable, royalty-free license in the invention herein described, throughout the world for all purposes of the United States Government, with the power to grant sublicenses for such purposes, is hereby granted to the Government of the United States of America.

CROSS REFERENCES TO RELATED APPLICATIONS

Commonly owned copending application S.N. 547,720 of Maher, filed May 5, 1966, now U.S. Pat. No. 3,436,305 discloses and claims the herein employed polyethylenimine-reacted starch xanthate additives (starch thiourethanes, more recently also termed thiocarbamates) as well as a process for greatly improving the wet and dry strength properties of paper by wet-end incorporation of the therein disclosed previously unknown starch thiourethanes, the starch xanthate reactant of the thiourethane being critically characterized by a xanthate D.S. of 0.12 to 0.25, and then precipitating the starch thiourethane onto the cellulosic pulp fibers by lowering the pH.

Commonly owned copending application S.N. 580,555 of Buchanan et al., filed Sept. 19, 1966, now U.S. Pat. No. 3,442,832 teaches that the addition of considerable amounts of starch xanthate solution to a rubber latex followed by coprecipitation of the two polymeric components provides highly reinforced rubber crumb without carbon black or lignin fillers or reinforcing agents, which crumbs can then be processed into white rubber suited for use as the whitewall component of tires.

FIELD OF THE INVENTION

The present invention pertains to the discovery that the starch polyethylenimino thiourethanes produced by reacting low D.S. starch xanthate, i.e., having a xanthate D.S. of 0.14–0.58 with at least 3.0 and preferably about 3.5 stoichiometric equivalents (calculated on the number of xanthate groups in the starch xanthate) of either low or high molecular weight polyethylenimine, depending on whether it is preferred that the dominant improvement be in abrasion resistance or in tensile strength, very beneficially can be added to latexes of synthetic rubber and that the starch thiourethane additive and the rubber are quantitatively coprecipitated from solution as lightly colored, easily dewatered crumbs, compounded sheets of which, containing neither lignins nor furnace blacks, can be vulcanized in as little as 5 or 10 minutes to yield cured rubber stock, exhibiting greatly improved physical properties, whereby the inexpensively reinforced and quickly cured styrene-butadiene or butadiene-acrylonitrile stocks have utility for tire components, footwear, belting, hoses, and similar mechanical rubber goods.

DESCRIPTION OF THE PRIOR ART

The strengthening and/or filling of natural and synthetic rubbers by extensive intimate incorporations of such costly and inherently dark brown to black reinforcing agents as the lignins and the various furnace blacks is fully conventional, but the thereby strengthened rubbers necessarily exhibit corresponding essentially black colorations that cannot be covered by other pigments.

As has been indicated above, copending Buchanan et al. application S.N. 580,555 teaches the incorporation of certain starch xanthates in lieu of the conventional reinforcing agents provides greatly strengthened, essentially white rubbers that can be colored with pastel dyes if desired. However, unlike the starch thiourethanes of the instant invention, incorporations of the starch xanthates per se do not appreciably shorten the required vulcanization times.

British Pat. 783,728 and British 823,482 teach that certain alkene ethylenimine sulfur derivatives have utility as vulcanization accelerators, but these derivatives do not also reinforce the rubber.

Similarly, German Pat. 879,314 teaches that chlorinated rubbers are stabilized against oxidative deterioration by a phosphorus containing amide of ethylenimine.

Belgian Pat. No. 612,198 teaches that when tire cord, e.g., polyethylene terephthalate, is treated with polyethylenimine and the so-treated cord is then reacted with a solution containing an elastomer, the cord remains flexible and elastic and particularly exhibits improved adhesion of the cord to the rubber into which it is subsequently incorporated.

Pechukas, U.S. 2,692,871, teaches that the cure rate and physical properties of rubber are improved by the addition of an alkylene polyamine with up to 5 C atoms, e.g., $(NH_2C_2H_4)_2$ or even tetraethylenepentamine, which very low molecular weight compounds certainly do not suggest the use of the instantly employed extremely high molecular weight copolymers, whereof the sodium starch xanthate component alone has a molecular weight of probably at least 1 million and whereof the molecular weight of the commercial polyethylenimine constituent is either 3,000 or 100,000.

Watt, U.S. 2,910,466, reacted polyethylenimine with viscose to form filaments and shaped structures having utility as ion exchange media.

Everett, U.S. 2,945,826 teaches that foam rubber cushions and the like exhibit improved compression resistance and firmness if a small amount of raw starch is introduced prior to foaming the rubber and then heating the foam to gelatinize the starch in situ.

SUMMARY

An object of the instant invention is a process for greatly reinforcing synthetic rubbers by coprecipitating the rubber with a lightly colored starch polyethylenimino thiourethane copolymer that also greatly shortens the vulcanization time of the so-produced lightly colored rubber.

A related object is the production of strengthened rubbers having widespread practical employments without the cost and color liabilities that are inherent in the conventional rubber reinforcing agents.

DESCRIPTION OF THE PREFERRED EMBODIMENTS

Although the preparation of the herein employed starch thiourethanes is set forth in Die Stärke 11:354 (1967), a detailed representative synthesis is described in Example 1.

EXAMPLE 1

A 6,000 ml. stainless steel reactor equipped with a motor driven agitator was charged with 42.8 g. of a commercially obtained solution containing 33 percent by weight of polyethylenimine having a molecular weight of about 100,000 (corresponding to the presence of about 2,325 $C_2H_4NH$ units). The polyethylenimine solution, containing 14.27 g. (dry basis) or 0.33 mole of polyethylenimine, was diluted with 718 ml. of water, and to the resulting 1.9 percent solution was added 718 g. of an 11.05 percent aqueous solution of freshly prepared sodium starch xanthate having a xanthate D.S. of 0.22 and a pH of 11.5. Based on the 79.34 g. (D.B.) content of sodium starch xanthate, there were 3.5 stoichiometric equivalents of the polyethylenimine reactant. After a thorough mixing, the reaction mixture was allowed to stand for 12 hours at room temperature. The starch thiourethane product was diluted with 1,100 ml. distilled water to provide a 3.1 percent final concentration. Then 320.5 g. (200 g. dry basis) of SBR-2105 Latex (Goodyear Rubber Company's trade designation for an aqueous latex containing 62.1 percent, dry basis, of an elastomeric copolymer consisting of 30 percent polystyrene and 70 percent polybutadiene) was added to the above thiourethane solution containing 70 g. of starch per se. After 30 minutes of stirring, the pH was found to be 10.95. Then 1 M $ZnSO_4$ solution (55 ml.) and 225 ml. of 1 N $H_2SO_4$ were added to lower the pH of the serum to 6.3, thereby quantitatively coprecipitating the starch thiourethane and the suspended rubber particles. The resulting small curds were further aggregated into more easily filtered crumbs by stirring for an additional hour. Following suction filtration, the crumbs were dried to less than 1 percent residual moisture in a forced air oven at 70° C. and the dry crumbs were consolidated into small, thin sheets by passage through a conventional roll mill, and then combined and milled into a larger and thicker sheet on the same mill before compounding thereon with 5.0 parts of ZnO per 100 parts by weight of rubber (based on the 200 g. of rubber in the original latex), plus 1.5 parts stearic acid, 2.0 parts of sulfur, 1.5 parts mercaptobenzothiazole, and 1.5 parts diphenylamine antioxidant, all on the same basis, and then the compounded slab was press cured in only 5 minutes at a temperature of 150° C. under a pressure of 444 p.s.i.

The so-obtained vulcanized rubber containing 40.6 parts by weight of starch thiourethane per 100 parts by weight of rubber when tested in accordance with ASTM D412-66 exhibited a tensile strength of 2,640 p.s.i., an ultimate elongation value of 290 percent, and when further tested in accordance with ASTM D394-59 (1965) exhibited an abrasion resistance value of 53.74. It also had a Shore hardness value of 72, and a compression-set value of 32.28 percent. The corresponding values for the SBR-2105 control without any of the starch thiourethane reinforcing agent were 115 p.s.i., 405 p.s.i., 920 percent, an abrasion value of 5.55, a hardness value of 60, and a compression-set value of 43.66 percent. Somewhat lesser but nevertheless valuable extents of reinforcement are obtained with starch thiourethanes prepared from starch xanthates wherein the xanthate D.S. value is as low as 0.14 and as high as 0.58.

EXAMPLE 2

The reactor of Example 1 was charged with 50.2 g. of a 50 percent by weight commercial solution of low (3,000) molecular weight polyethylenimine. The solution was diluted with 784 g. water and to the resulting almost precisely 3 percent solution was added 784 g. of a 10.96 percent sodium starch xanthate solution (85.9 g. starch xanthate, D.B.) whereof the xanthate D.S. was 0.24 instead of 0.22 as in Example 1. The stoichiometric ratio of the polyethylenimine to the starch xanthate was 5.2:1. After 3 days of reaction, the reacted solution was diluted with 1,000 ml. of water to provide a 3.4 percent content of the starch thiourethane.

Then 455.2 g. (300 g. elastomer dry basis) of the SBR-2105 Latex was stirred into the above solution. After stirring for 30 minutes the pH was 10.9. To quantitatively coprecipitate the polymeric constituents, 90 ml. of molar $ZnSO_4$ and 265 ml. of 1 N $H_2SO_4$ were added, thereby lowering the pH to 6.25. After stirring for 30 minutes the crumbs were obtained by suction filtration and then they were air oven dried to a residual moisture content of 2.1 percent. The dried crumbs were sheeted, compounded, and pressure cured (5 minutes) as in Example 1. The corresponding test values were: modulus 2,130 p.s.i.; tensile 2,130 p.s.i.; ultimate elongation of 300 percent; abrasion resistance value of 116.7; hardness value of 72, and a compression set value of 22.1 percent.

EXAMPLE 3

In this experiment the elastomer was "Chemigum 236" which is the trade designation of the Goodyear Tire and Rubber Company for a latex having a 40.8 percent concentration of an elastomeric copolymer consisting of 55 percent polybutadiene and 45 percent polyacrylonitrile.

Fifty and four-tenths grams (16.8 grams dry basis) of the 100,000 MW polyethylenimine were placed into the previously described reactor and then diluted with 800 ml. water followed by the addition of 800 g. of a 10.8 percent solution of freshly prepared sodium starch xanthate having a xanthate D.S. of 0.24. The polyethylenimine corresponded to 3.5 stoichiometric equivalents based on the number of starch xanthate groups present. The well-mixed reaction mixture was allowed to stand for 12 hours and then was diluted with 1,100 ml. distilled water.

To the so-produced starch thiourethane solution were added 735.3 g. of the latex containing 300 g. of the elastomer.

The pH of the above dispersion was lowered from that of 11.1 to pH 6.2 by adding 75 ml. 1 M $ZnSO_4$ and 205 ml. 1 N $H_2SO_4$. The quantitatively coprecipitated starch thiourethane-reinforced crumbs were dried to a residual moisture of 1.05 percent and then sheeted and compounded precisely as in the previous examples. The rubber slabs were press cured for 15 minutes instead of for only 5 minutes.

The vulcanized rubber was found to have a 300 percent modulus of 2,240 p.s.i., an ultimate elongation of 300 percent, a tensile strength of 2,240 p.s.i., a hardness value of 84, and an abrasion resistance value of 93.7, compared with a control modulus of 180 p.s.i., an ultimate elongation of 815 percent, and a tensile strength of 1,160 p.s.i.

We claim:
1. A process for obtaining nonblackened reinforced diene-type rubbers that when conventionally compounded can be pressure molded in only 5–15 minutes to yield vulcanizates that exhibit increased abrasion resistance and tensile strengths of from about 2,100 p.s.i. to about 2,700 p.s.i., said process comprising forming an intimately mixed aqueous dispersion of (a) a synthetic rubber latex containing a dispersed elastomer selected from the group consisting of a butadiene-acrylonitrile copolymer and a butadiene-styrene copolymer and (b) an aqueous dispersion containing therein about 29–41 parts by weight (per 100 parts dry basis weight of the copolymer) of a starch thiourethane formed by reacting sodium starch xanthate having a xanthate D.S. of about 0.22–0.24 with 3.5–5.2 stoichiometric equivalents of polyethylenimine having a molecular weight of 3,000–100,000, and then adding sufficient $ZnSO_4$ and $H_2SO_4$ to quantitatively coprecipitate the elastomer and starch thiourethane in the form of filterable crumbs.

2. Rubber crumbs produced by the process of claim 1.

3. High tensile strength tan rubbers obtained by subjecting conventionally compounded sheets, prepared from the crumb rubber produced in accordance with the process of claim 1, to about 5–15 minutes of pressure vulcanization.

References Cited

UNITED STATES PATENTS

| | | |
|---|---|---|
| 3,107,225 | 10/1963 | Rogers. |
| 3,436,305 | 4/1969 | Maher. |
| 3,442,832 | 5/1969 | Buchanan et al. |

WILLIAM H. SHORT, Primary Examiner

R. J. KOCH, Assistant Examiner

U.S. Cl. X.R.

260—29.7